(12) United States Patent
Wang et al.

(10) Patent No.: US 9,909,868 B2
(45) Date of Patent: Mar. 6, 2018

(54) GAUGING JIG AND FILM ATTACHING DEVICE HAVING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Hongbin Wang, Beijing (CN); Rong Zhang, Beijing (CN); Kai Yin, Beijing (CN); He Zhang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 246 days.

(21) Appl. No.: 14/803,857

(22) Filed: Jul. 20, 2015

(65) Prior Publication Data
US 2016/0069661 A1 Mar. 10, 2016

(30) Foreign Application Priority Data
Sep. 4, 2014 (CN) .......................... 2014 1 0449623

(51) Int. Cl.
| | |
|---|---|
| *G01C 9/34* | (2006.01) |
| *G02F 1/13* | (2006.01) |
| *G01B 5/25* | (2006.01) |
| *G02B 5/30* | (2006.01) |

(52) U.S. Cl.
CPC ................ *G01C 9/34* (2013.01); *G01B 5/25* (2013.01); *G02B 5/3033* (2013.01); *G02F 1/1303* (2013.01)

(58) Field of Classification Search
CPC ............ G01C 9/34; G01B 5/14; G02F 1/1303
USPC ................................ 33/657, 451; 7/657, 451
See application file for complete search history.

(56) References Cited

U.S. PATENT DOCUMENTS

| | | | | |
|---|---|---|---|---|
| 273,065 A | * | 2/1883 | Gray ........................ | G01B 7/14 33/657 |
| 426,001 A | * | 4/1890 | Evans ...................... | G01C 9/26 33/27.033 |
| 446,764 A | * | 2/1891 | Adams ..................... | G01B 7/14 33/350 |
| 762,010 A | * | 6/1904 | Uncapher ................ | G01B 7/14 101/248 |

(Continued)

*Primary Examiner* — Christopher Fulton
(74) *Attorney, Agent, or Firm* — Nath, Goldberg & Meyer; Joshua B. Goldberg

(57) ABSTRACT

The present invention provides a gauging jig, for gauging whether projections of first and second rollers, which are disposed in parallel on both sides of a carrying surface of a platform, coincide on the surface. The gauging jig includes a pointer instrument which is provided on a side of the platform and perpendicular to the carrying surface. The pointer instrument has a first end and a second end. The first end is connected to the first roller and intersects with a central axis of the first roller, while the second end extends close to the second roller. With the gauging jig, an operator can promptly and accurately gauge whether the projections of the first and second rollers coincide on the carrying surface. Therefore, gauging time can be saved while times of trial production can be reduced or even omitted, thereby improving the production efficiency and reducing cost.

19 Claims, 3 Drawing Sheets

(56) References Cited

U.S. PATENT DOCUMENTS

| | | | | |
|---|---|---|---|---|
| 1,563,534 A | * | 12/1925 | De Walt | D01G 15/84 33/657 |
| 1,594,604 A | * | 8/1926 | Christy | B43L 7/005 33/342 |
| 3,715,808 A | * | 2/1973 | Petrik | G01C 15/10 33/347 |
| 6,449,859 B1 | * | 9/2002 | Zugel | G01C 9/32 33/348 |
| 6,493,955 B1 | * | 12/2002 | Moretti | G01C 15/008 33/286 |
| 8,065,812 B2 | * | 11/2011 | Zhang | G01B 3/22 33/533 |
| 8,739,423 B1 | * | 6/2014 | Cortum | A47G 1/205 33/374 |
| 2002/0170189 A1 | * | 11/2002 | Cheatham | E04F 21/0015 33/194 |
| 2011/0219633 A1 | * | 9/2011 | Hanna | G01B 11/27 33/286 |

* cited by examiner

GAUGING JIG AND FILM ATTACHING DEVICE HAVING THE SAME

FIELD OF THE INVENTION

The present invention relates to the field of liquid crystal display technologies, and in particular, to a gauging jig and a film attaching device having the same.

BACKGROUND OF THE INVENTION

Polaroid (POL) is an essential part of a Liquid Crystal Display (hereinafter referred to as LCD) for realizing a display function. In a manufacturing process of the LCD, POL is necessarily attached to a display panel by using a film attaching device.

FIG. 1 is a schematic diagram showing a film attaching device in the prior art. As shown in FIG. 1, the film attaching device generally includes a platform, and a first roller 2 and a second roller 3 which are disposed in parallel on both sides of a carrying surface of the platform. The rollers are used to laminate a POL onto a display panel when the display panel and POL placed on the platform pass between the first roller 2 and the second roller 3. In general, only one roller (for example, the second roller 3 located at the upper portion in FIG. 1) can be observed by an operator.

When the film attaching device attaches the POL to the display panel, projections of the first roller 2 and the second roller 3 on the carrying surface of the platform are required to completely coincide, otherwise linear bubbles may occur on the display panel or the display panel may jitter, thereby leading to spots (Mura) on the display screen. However, the operator generally cannot observe the lower first roller 2, which causes that it is difficult to regulate the first roller 2 and the second roller 3 to coincide.

SUMMARY OF THE INVENTION

To address at least one of technical problems in the prior art, the present invention provided a gauging jig and a film attaching device having the same, so as to promptly and accurately gauging whether projections of a first roller and a second roller coincide on a carrying surface of a platform.

According to an aspect of the present invention, the gauging jig is provided to gauge whether projections of a first roller and a second roller, which are disposed in parallel on both sides of a carrying surface of a platform, coincide on the carrying surface of the platform.

The gauging jig includes a pointer instrument which is provided at a side of the platform and perpendicular to the carrying surface of the platform, the pointer instrument has a first end and a second end, the first end of the pointer instrument is connected to the first roller and intersects with a central axis of the first roller, while the second end of the pointer instrument extends close to the second roller, and when the projections of the first roller and the second roller coincide on the carrying surface of the platform, the second end of the pointer instrument intersects with a central axis of second roller; when the projections of the first roller and the second roller do not coincide on the carrying surface of the platform, the second end of the pointer instrument deviates from the central axis of the second roller.

Preferably, the carrying surface of the platform is a horizontal plane.

Preferably, the gauging jig further includes a pivot, an axis of which coincides with the central axis of the first roller, and the first end of the pointer instrument is movably connected with the pivot.

Preferably, the pivot is provided with a pin located on the axis thereof, an orifice may be formed at the first end of the pointer instrument, and the pin of the pivot is inserted into the orifice of the pointer instrument, such that the pointer instrument is capable of being pivoted about the pin of the pivot.

Preferably, the pointer instrument further includes a pointer yoke and a pointer mounted to the pointer yoke, and the pointer extends upwards from the pointer yoke.

Preferably, the pointer is detachably mounted to the pointer yoke.

Preferably, the pointer is of a sheet-like or needle-like shape.

Preferably, the gauging jig further includes a level gauge mounted in a receptacle of the pointer instrument, and the level gauge is used for gauging whether the pointer instrument is vertical.

Preferably, the level gauge includes a bubble level gauge which is positioned to be perpendicular to the pointer instrument.

Preferably, the gauging jig further includes a connecting component, in which concentric first hole and second hole are formed, and an end of the first roller is arranged to pass through the first hole, while the pivot connected to the pointer instrument is inserted into the second hole.

Preferably, the pointer instrument is provided with a weight at its bottom, such that the pointer instrument tends to keep being vertical under the action of gravity.

As another aspect of the present invention, there is also provided a film attaching device, including: a platform; a first roller and a second roller disposed in parallel on both sides of a carrying surface of the platform; and the gauging jig as described above according to the present invention.

The embodiments of the present invention have advantages as follows: according to the embodiments of the present invention, as long as the pointer instrument is perpendicular to the horizontal carrying surface and the first end of the pointer instrument intersects with the central axis of the first roller, the operator can determine whether the projections of the first roller and the second roller coincide on the carrying surface by observing the positional relation between the second end of the pointer instrument and the central axis of the second roller. Thus, the operator can accurately and promptly determine whether the projections of the first roller and the second roller coincide on the carrying surface even though he/she cannot see the first roller, whereby improving the efficiency.

BRIEF DESCRIPTION OF THE DRAWINGS

Accompanying drawings, which constitute a part of the description, are used for providing further understanding of the present invention, and for explaining the present invention together with the following specific embodiments, rather than limiting the present invention. In the accompanying drawings.

Figure 1:
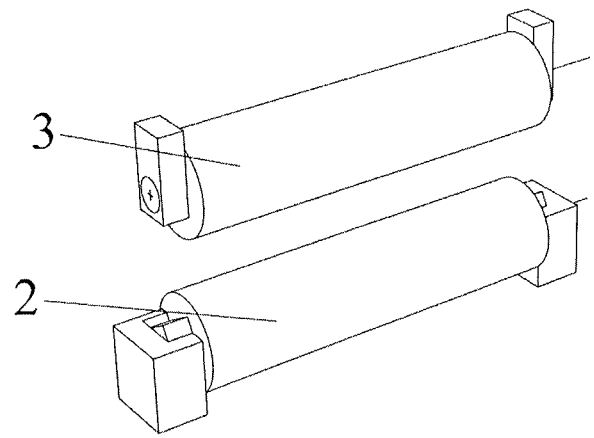
FIG. 1 is a schematic diagram showing a film attaching device in the prior art.

In reference numerals:

1-gauging jig; 2-first roller; 3-second roller; 4-pivot; 41-pin; 5-connecting component; 51-first hole; 52-second hole; 10-pointer instrument; 11-level gauge; 101-pointer yoke; 101a-first end; 101b-second end; 102-pointer; 103-orifice; 104-receptacle.

DETAILED DESCRIPTION OF THE EMBODIMENTS

Hereinafter, specific embodiments of the present invention will be described in detail in conjunction with the accompanying drawings. It should be understood, the specific embodiments as set forth herein are merely used for illustrating and explaining the present invention, rather than limiting the present invention.

Figure 2:
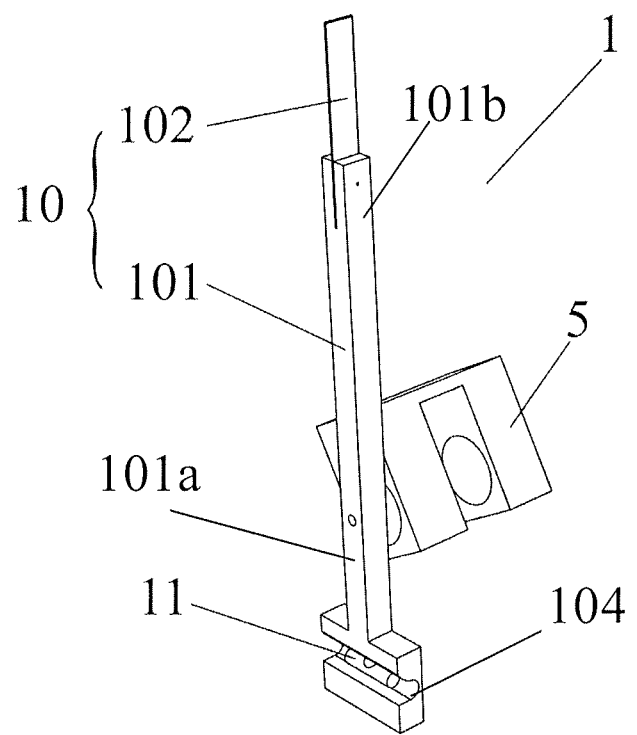
FIG. 2 is a schematic diagram showing a structure of a gauging jig according to an embodiment of the present invention.
Figure 3:
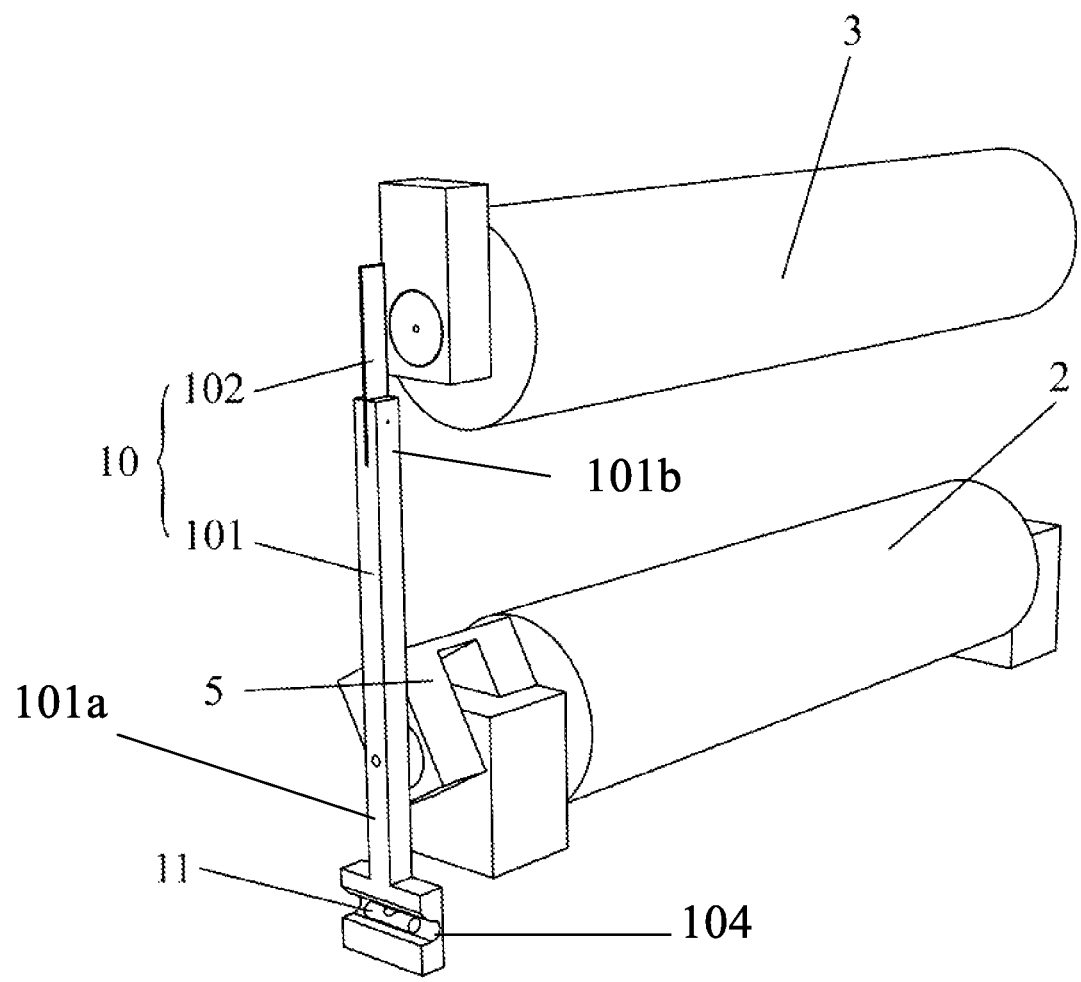
FIG. 3 is a schematic diagram of the gauging jig as shown in FIG. 2 when gauging whether projections of a first roller and a second roller coincide on a carrying surface of a platform.
Figure 4:
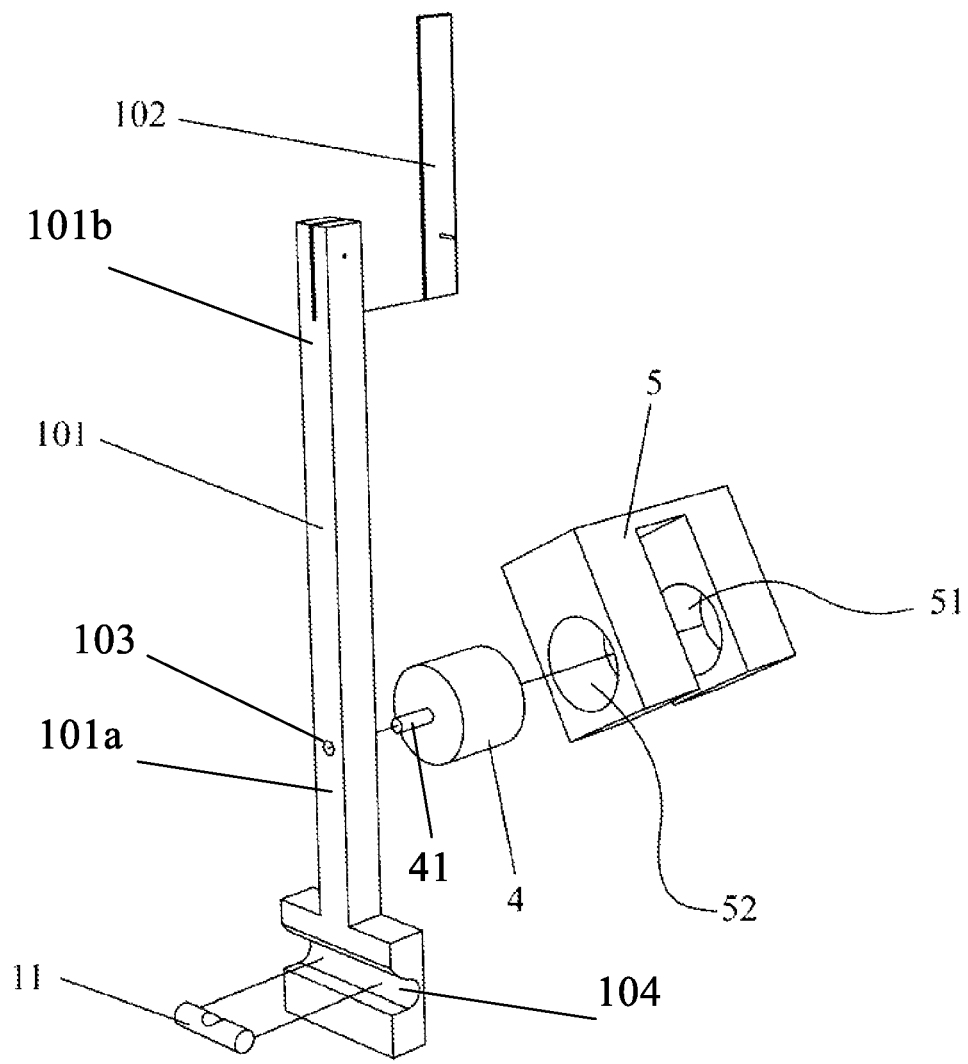
FIG. 4 is an exploded schematic diagram of the gauging jig as shown in FIG. 2.

With reference to FIGS. 2-4, FIG. 2 is a schematic diagram showing a structure of a gauging jig according to an embodiment of the present invention; FIG. 3 is a schematic diagram of the gauging jig as shown in FIG. 2 when gauging whether projections of a first roller and a second roller coincide on a carrying surface of a platform; and FIG. 4 is an exploded schematic diagram of the gauging jig as shown in FIG. 2.

A gauging jig 1 is provided to gauge whether projections of a first roller 2 and a second roller 3, which are disposed in parallel on both sides of a carrying surface of a platform (not shown), coincide on the carrying surface of the platform. The gauging jig 1 may include a pointer instrument 10 which is provided on a side of the platform and perpendicular to the carrying surface of the platform. The pointer instrument 10 may have a first end 101a (lower end in figures) and a second end 101b (upper end in figures). The first end 101a of the pointer instrument 10 may be connected to the first roller 2 and intersect with a central axis of the first roller 2. The second end 101b of the pointer instrument 10 may extend close to the second roller 3.

Specifically, since the pointer instrument 10 is perpendicular to the carrying surface of the platform and the first end 101a of the pointer instrument 10 intersects with the central axis of first roller 2, if the projections of the first roller 2 and the second roller 3 coincide on the carrying surface of the platform, the second end 101b of the pointer instrument 10 will intersect with a central axis of second roller 3. If the projections of the first roller 2 and the second roller 3 do not coincide on the carrying surface of the platform, the second end 101b of the pointer instrument 10 will deviate from the central axis of the second roller 3. Thus, as long as the pointer instrument 10 is perpendicular to the carrying surface of the platform and the first end 101a of the pointer instrument 10 intersects with the central axis of the first roller 2, whether the projections of the first roller 2 and the second roller 3 coincide on the carrying surface of the platform or not can be determined according to spatial position between the second end 101b of the pointer instrument 10 and the central axis of the second roller 3.

In a preferred embodiment of the present invention, as shown in FIG. 4, the gauging jig 1 may further include a pivot 4. An axis of the pivot 4 may coincide with the central axis of the first roller 2. The pivot 4 may be provided with a pin 41 located on the axis thereof. Accordingly, an orifice 103 may be formed at the first end 101a of the pointer instrument 10. The pin 41 of the pivot 4 may be inserted into the orifice 103 of the pointer instrument 10, such that the pointer instrument 10 can be pivoted or swung about the pin 41 of the pivot 4. That is to say, the first end 101a of the pointer instrument 10 may be movably connected with the pivot 4 on the central axis of the first roller 2. The term "movably connected" used herein indicates that the pointer instrument 10 can rotate with respect to the pivot 4, but the pointer instrument 10 cannot rotate in response to rotation of the pivot 4. Herein, the carrying surface of the platform is a horizontal plane. Accordingly, the pointer instrument 10 should be kept vertical. In this case, it should be appreciated that the pointer instrument 10 is provided with a weight (not shown) at its bottom, such that the pointer instrument 10 tends to keep being vertical under the action of gravity. In such a manner, an operator can easily determine whether the projections of the first roller 2 and the second roller 3 coincide on the carrying surface of the platform according to positional relation between the second end 101b of pointer instrument 10 and the central axis of second roller 3.

In a preferred embodiment of the present invention, as shown in FIG. 4, the gauging jig 1 may further include a connecting component 5, in which concentric first hole 51 and second hole 52 are formed. An end of the first roller 2 is arranged to pass through the first hole 51, while the pivot 4 connectable to the pointer instrument 10 is inserted into the second hole 52. According to a preferred embodiment of the present invention, the pointer instrument 10 may be kept vertical, and the vertical pointer instrument 10 is located within a vertical plane where the central axis of first roller 2 is located.

It should be noted that, in this embodiment, the pivot 4 is arranged in the second hole 52 of the connecting component 5, but the present invention is not limited thereto. In practical applications, the pivot 4 may be directly arranged to the first roller 2 without the connecting component 5.

In this embodiment, the pointer instrument 10 may further include a pointer yoke 101 and a pointer 102 mounted to the pointer yoke 101. The pointer 102 extends upwards from the pointer yoke 101. Specifically, the pointer 102 is positioned at the second end 101b of the pointer instrument 10.

In a preferred embodiment of the present invention, the pointer 102 is detachably mounted to the pointer yoke 101. In such a manner, pointers 102 having different lengths may be mounted to the pointer yoke 101, such that the length of the pointer 102 can reach the level of the central axis of the second roller 3. In a preferred embodiment of the present invention, the pointer 102 may be of a sheet-like or needle-like shape.

In a preferred embodiment of the present invention, the gauging jig 1 may further include a level gauge 11 mounted in a receptacle 104 of the pointer instrument 10. The level gauge 11 may be used for gauging whether the pointer instrument 10 is vertical. Specifically, the level gauge 11 may include a bubble level gauge which is positioned to be perpendicular to the pointer instrument 10. By gauging the position of bubble in the bubble level gauge, whether it is in a horizontal status can be determined. Since the bubble level gauge is perpendicular to the pointer instrument 10, when the bubble level gauge is in the horizontal status, the pointer instrument 10 is in a vertical status; and when the bubble level gauge is not in the horizontal status, the pointer instrument 10 is not in a vertical status. Therefore, according to the gauging status of the bubble level gauge, whether the pointer instrument 10 is in the vertical status can be determined. If the pointer instrument 10 is not in the vertical status, the pointer instrument 10 is necessarily regulated to the vertical status.

As set forth above, fundamental principle of the gauging jig 1 according to the present invention is as follows: the gauging jig 1 may include a pointer instrument 10 which is perpendicular to the carrying surface of the platform. The pointer instrument 10 may have a first end 101a (lower end in figures) and a second end 101b (upper end in figures). The first end 101a of the pointer instrument 10 may intersect with a central axis of the first roller 2 and the second end 101b of the pointer instrument 10 may extend close to the second roller 3. When the projections of the first roller 2 and the second roller 3 coincide on the carrying surface of the platform, the second end 101b of the pointer instrument 10 may intersect with a central axis of the second roller 3; when the projections of the first roller 2 and the second roller 3 do not coincide on the carrying surface of the platform, the second end 101b of the pointer instrument 10 will deviate from the central axis of the second roller 3. Thus, as long as the pointer instrument 10 is perpendicular to the carrying surface of the platform and the first end 101a of the pointer instrument 10 intersects with the central axis of the first roller 2, the operator can determine whether the projections of the first roller 2 and the second roller 3 coincide on the carrying surface of the platform or not, by observing the spatial relation between the second end 101b of pointer instrument 10 and the central axis of second roller 3. Compared to the prior art, simply by observing the upper second roller 3 which can be easily seen without consideration of the lower first roller 2, the operator can promptly and accurately gauge whether the projections of the first roller 2 and the second roller 3 coincide on the carrying surface of the platform. Therefore, with the gauging jig 1 according to the present invention, gauging time can be saved while times of trial production can be reduced or even omitted, thereby improving the production efficiency and reducing cost.

As another aspect of the present invention, there is also provided a film attaching device, which includes: a platform; a first roller and a second roller disposed in parallel on both sides of a carrying surface of the platform; and the gauging jig as described above.

Since the film attaching device of the present invention includes the gauging jig as described above, it can promptly and accurately gauge whether the projections of the first roller and the second roller coincide on the carrying surface of the platform. Therefore, according to the present invention, gauging time can be saved while times of trial production can be reduced or even omitted, thereby improving the production efficiency and reducing cost.

It should be understood that the above implementations are merely exemplary implementations for the purpose of illustrating the principle of the present invention, and the present invention is not limited thereto. Various modifications and improvements can be made by a person having ordinary skill in the art without departing from the spirit and essence of the present invention. Accordingly, all of the modifications and improvements also fall into the protection scope of the present invention.

The invention claimed is:

1. A gauging jig, which is used for gauging whether projections of a first roller and a second roller, which are disposed in parallel on both sides of a carrying surface of a platform, coincide on the carrying surface of the platform, wherein the gauging jig includes a pointer instrument which is provided on a side of the platform and perpendicular to the carrying surface of the platform, the pointer instrument has a first end and a second end, the first end of the pointer instrument is connected to the first roller and intersects with a central axis of the first roller, while the second end of the pointer instrument extends close to the second roller, when the projections of the first roller and the second roller coincide on the carrying surface of the platform, the second end of the pointer instrument intersects with a central axis of second roller; and when the projections of the first roller and the second roller do not coincide on the carrying surface of the platform, the second end of the pointer instrument deviates from the central axis of the second roller, and the gauging jig further includes a pivot, an axis of which coincides with the central axis of the first roller, and the first end of the pointer instrument is movably connected with the pivot.

2. The gauging jig according to claim 1, wherein the carrying surface of the platform is a horizontal plane.

3. The gauging jig according to claim 1, wherein the pivot is provided with a pin located on the axis of the pivot, an orifice is formed at the first end of the pointer instrument, and the pin of the pivot is inserted into the orifice of the pointer instrument, such that the pointer instrument is capable of being pivoted about the pin of the pivot.

4. The gauging jig according to claim 1, wherein the pointer instrument further includes a pointer yoke and a pointer mounted to the pointer yoke, and the pointer extends upwards from the pointer yoke.

5. The gauging jig according to claim 4, wherein the pointer is detachably mounted to the pointer yoke.

6. The gauging jig according to claim 4, wherein the pointer is of a sheet-like or needle-like shape.

7. The gauging jig according to claim 1, wherein the gauging jig further includes a level gauge mounted in a receptacle of the pointer instrument, and the level gauge is used for gauging whether the pointer instrument is vertical.

8. The gauging jig according to claim 7, wherein the level gauge includes a bubble level gauge which is positioned to be perpendicular to the pointer instrument.

9. The gauging jig according to claim 1, wherein the gauging jig further includes a connecting component, in which concentric first hole and second hole are formed, and an end of the first roller is arranged to pass through the first hole, while the pivot connectable to the pointer instrument is inserted into the second hole.

10. The gauging jig according claim 1, wherein the pointer instrument is provided with a weight at its bottom, such that the pointer instrument tends to keep being vertical under the action of gravity.

11. A film attaching device, including: a platform; and a first roller and a second roller disposed in parallel on both sides of a carrying surface of the platform, wherein the film attaching device further includes the gauging jig according to claim 1.

12. The film attaching device according to claim 11, wherein the carrying surface of the platform is a horizontal plane.

13. The film attaching device according to claim 11, wherein the gauging jig further includes a pivot, an axis of which coincides with the central axis of the first roller, and the first end of the pointer instrument is movably connected with the pivot.

14. The film attaching device according to claim 13, wherein the pivot is provided with a pin located on the axis of the pivot, an orifice is formed at the first end of the pointer instrument, and the pin of the pivot is inserted into the orifice of the pointer instrument, such that the pointer instrument is capable of being pivoted about the pin of the pivot.

15. The film attaching device according to claim 13, wherein the gauging jig further includes a connecting component, in which concentric first hole and second hole are formed, and an end of the first roller is arranged to pass through the first hole, while the pivot connectable to the pointer instrument is inserted into the second hole.

16. The film attaching device according to claim 13, wherein the pointer instrument is provided with a weight at its bottom, such that the pointer instrument tends to keep being vertical under the action of gravity.

17. The film attaching device according to claim 11, wherein the pointer instrument further includes a pointer yoke and a pointer mounted to the pointer yoke, and the pointer extends upwards from the pointer yoke.

18. The film attaching device according to claim 11, wherein the gauging jig further includes a level gauge mounted in a receptacle of the pointer instrument, and the level gauge is used for gauging whether the pointer instrument is vertical.

19. The film attaching device according to claim 18, wherein the level gauge includes a bubble level gauge which is positioned to be perpendicular to the pointer instrument.

* * * * *